UNITED STATES PATENT OFFICE.

WALTER NORTHCOTE NAYLOR, OF FOREST HILL, LONDON, AND STANLEY PAGE HUTTON, OF BECKENHAM, ENGLAND.

ALUMINIUM ALLOY.

1,080,155. Specification of Letters Patent. Patented Dec. 2, 1913.

No Drawing. Original application filed November 22, 1912, Serial No. 732,972. Divided and this application filed May 17, 1913. Serial No. 768,378.

*To all whom it may concern:*

Be it known that we, WALTER NORTHCOTE NAYLOR and STANLEY PAGE HUTTON, citizens of the United Kingdom of Great Britain and Ireland, and residents of 169 Stanstead road, Forest Hill, in the county of London, England, and 30 Manor road, Beckenham, in the county of Kent, England, respectively, have invented certain new and useful Improvements in and Relating to Aluminium Alloys, of which the following is a specification, such as will enable others skilled in the art to which it appertains to make and use the same.

This invention relates to an aluminium alloy.

The alloy consists of aluminium, magnesium, phosphor tin and phosphorus, the proportions of which may vary. The proportions may, for example, be as follows: Aluminium 93.89 per cent.; magnesium 4.89 per cent.; phosphor tin .73 per cent.; phosphorus .49 per cent. The phosphor tin, above mentioned, is five per cent. phosphorus.

This is a divisional application of our application, Serial No. 732972, filed Nov. 22, 1912.

What we claim and desire to secure by Letters Patent is:

1. An alloy consisting of aluminium, magnesium, phosphor tin and phosphorus.

2. An alloy consisting of aluminium, magnesium, phosphor tin and phosphorus in about the following proportions: aluminium, 93.89 per cent.; magnesium, 4.89 per cent.; phosphor tin, .73 per cent., and phosphorus, .49 per cent.

In witness whereof we have hereunto set our hands in presence of two witnesses.

WALTER NORTHCOTE NAYLOR.
STANLEY PAGE HUTTON.

Witnesses to signature of Mr. Naylor:
FREDERIC SAMUEL ALLEN,
THOMAS JAMES BLOOMFIELD.

Witnesses to signature of Mr. Hutton:
WALTER J. SKERTEN,
J. W. PATCHING.